United States Patent
Malhotra et al.

(10) Patent No.: US 12,008,056 B2
(45) Date of Patent: Jun. 11, 2024

(54) SYSTEMS AND METHODS FOR IDENTIFYING A MEANING OF AN AMBIGUOUS TERM IN A NATURAL LANGUAGE QUERY

(71) Applicant: Rovi Guides, Inc., San Jose, CA (US)

(72) Inventors: Manik Malhotra, Bengaluru KA (IN); Ahmed Nizam Mohaideen P, Kovilpatti (IN); Sashikumar Venkataraman, Andover, MA (US)

(73) Assignee: Rovi Guides, Inc., San Jose, CA (US)

( * ) Notice: Subject to any disclaimer, the term of this patent is extended or adjusted under 35 U.S.C. 154(b) by 107 days.

(21) Appl. No.: 17/209,693

(22) Filed: Mar. 23, 2021

(65) Prior Publication Data
US 2021/0209183 A1    Jul. 8, 2021

Related U.S. Application Data

(63) Continuation of application No. 16/233,311, filed on Dec. 27, 2018, now Pat. No. 10,990,637, which is a
(Continued)

(51) Int. Cl.
*G06F 16/9535* (2019.01)
*G06F 16/2455* (2019.01)
*G06F 16/2457* (2019.01)

(52) U.S. Cl.
CPC ...... *G06F 16/9535* (2019.01); *G06F 16/2455* (2019.01); *G06F 16/24578* (2019.01)

(58) Field of Classification Search
None
See application file for complete search history.

(56) References Cited

U.S. PATENT DOCUMENTS 6,239,794 B1    5/2001    Yuen et al.
6,564,378 B1    5/2003    Satterfield et al.
(Continued)

FOREIGN PATENT DOCUMENTS

WO    WO-2006073983 A2 *    7/2006    ........... G06F 16/215
WO    WO-2011102765 A1 *    8/2011    ....... G06F 17/30867

OTHER PUBLICATIONS

Gupta, Udita, Puja Jagani, Darshan Hundia, and Khushali Deulkar. "Disambiguation of User Search Query." (2015) (Year: 2015).*

*Primary Examiner* — Uyen T Le
(74) *Attorney, Agent, or Firm* — Haley Guiliano LLP

(57) ABSTRACT

Methods and systems for identifying a meaning of an ambiguous term in a natural language query. The media guidance application isolates first and second terms from a query received from a user and identifies, in a knowledge graph, first and second pluralities of candidate components associated with the first and second terms. The first and second terms each having multiple candidate components indicates the first and second terms have ambiguous meanings. The media guidance application matches each candidate component of the first and second pluralities of candidate components to form a plurality of pairs and determines strength of association for each pair in the plurality of pairs. The media guidance application filters the plurality of pairs by strength of association for each pair and determines a plurality of possible meanings based on the filtered plurality of pairs. The media guidance application selects a meaning from the plurality of possible meanings.

20 Claims, 7 Drawing Sheets

Related U.S. Application Data continuation of application No. 15/095,833, filed on Apr. 11, 2016, now Pat. No. 10,169,470.

(56) References Cited

U.S. PATENT DOCUMENTS

| | | | |
|---|---|---|---|
| 7,165,098 B1 | 1/2007 | Boyer et al. | |
| 7,216,080 B2 | 5/2007 | Tsiao et al. | |
| 7,761,892 B2 | 7/2010 | Ellis et al. | |
| 8,046,801 B2 | 10/2011 | Ellis et al. | |
| 8,433,671 B2 | 4/2013 | Elbaz et al. | |
| 8,712,759 B2 | 4/2014 | Ylonen | |
| 8,949,241 B2 * | 2/2015 | Olof-Ors | G06F 16/9535 |
| | | | 707/739 |
| 9,336,269 B1 * | 5/2016 | Smith | G06F 16/951 |
| 9,569,541 B2 * | 2/2017 | Andersen | G06F 16/9535 |
| 2002/0174430 A1 | 11/2002 | Ellis et al. | |
| 2003/0212543 A1 * | 11/2003 | Epstein | G06F 40/289 |
| | | | 704/9 |
| 2005/0075874 A1 | 4/2005 | Balchandran et al. | |
| 2005/0251827 A1 | 11/2005 | Ellis et al. | |
| 2006/0224565 A1 * | 10/2006 | Ashutosh | G06F 16/35 |
| 2007/0136457 A1 * | 6/2007 | Dai | G06Q 30/02 |
| | | | 709/224 |
| 2007/0156747 A1 | 7/2007 | Samuelson et al. | |
| 2007/0214131 A1 * | 9/2007 | Cucerzan | G06F 16/951 |
| | | | 707/999.005 |
| 2009/0055355 A1 * | 2/2009 | Brunner | G06Q 30/02 |
| 2010/0153885 A1 | 6/2010 | Yates | |
| 2011/0302177 A1 * | 12/2011 | Cottingham | G06F 16/9038 |
| | | | 707/E17.061 |
| 2012/0096030 A1 * | 4/2012 | Kim | G06F 16/3349 |
| | | | 707/E17.014 |
| 2012/0117167 A1 * | 5/2012 | Sadja | H04L 67/288 |
| | | | 709/217 |
| 2012/0158685 A1 * | 6/2012 | White | G06F 16/9535 |
| | | | 707/723 |
| 2012/0158695 A1 | 6/2012 | Stuart et al. | |
| 2014/0040274 A1 | 2/2014 | Aravamudan et al. | |
| 2015/0178392 A1 * | 6/2015 | Jockisch | G06F 16/9535 |
| | | | 707/706 |
| 2015/0242510 A1 * | 8/2015 | Shapira | H04L 67/10 |
| | | | 707/706 |
| 2015/0379414 A1 | 12/2015 | Yeh et al. | |
| 2016/0035347 A1 | 2/2016 | Agarwal et al. | |
| 2016/0092447 A1 | 3/2016 | Venkataraman et al. | |
| 2016/0092550 A1 | 3/2016 | Kraft et al. | |
| 2016/0094889 A1 | 3/2016 | Venkataraman et al. | |
| 2017/0364507 A1 | 12/2017 | Byron et al. | |
| 2019/0026372 A1 * | 1/2019 | Lu | G06F 16/00 |
| 2019/0340211 A1 * | 11/2019 | Linda | G06F 16/9537 |

* cited by examiner

1000

1002 — Isolate a First Term and a Second Term from a Query Received from a User

1004 — Identify, In a Knowledge Graph, a First Plurality of Candidate Components Associated with the First Term, Wherein the First Term Having More than One Candidate Component Indicates the First Term has an Ambiguous Meaning 1006 — Identify, In the Knowledge Graph, a Second Plurality of Identified Candidate Components Associated With the Second Term, Wherein the Second Term Having More than One Candidate Component Indicates the Second Term has an Ambiguous Meaning 1008 — Match Each Candidate Component of the First Plurality of Candidate Components to Each Candidate Component of the Second Plurality of Candidate Components to Form a Plurality of Pairs 1010 — Determine a Strength of Association for Each Pair in the Plurality of Pairs 1012 — Filter the Plurality of Pairs by the Strength of Association for Each Pair 1014 — Determine a Plurality of Possible Meanings Associated with the Query Based on the Filtered Plurality of Pairs 1016 — Select a Meaning from the Plurality of Possible Meanings Associated With the Query

FIG. 10

SYSTEMS AND METHODS FOR IDENTIFYING A MEANING OF AN AMBIGUOUS TERM IN A NATURAL LANGUAGE QUERY

CROSS-REFERENCE TO RELATED APPLICATION

This application is a continuation of U.S. patent application Ser. No. 16/233,311, filed Dec. 27, 2018, which is a continuation of U.S. patent application Ser. No. 15/095,833, filed Apr. 11, 2016, now U.S. Pat. No. 10,169,470, the disclosure of each of which are hereby incorporated by reference herein in their entireties.

BACKGROUND

The increased use of natural language processing in systems that people use daily has greatly raised the average person's expectations regarding how the computer formulates an answer to a query formatted for natural conversation. Many terms in such queries are only given meaning based on context and other terms in the query. In order for systems to handle the increasingly complex natural language queries, it is necessary to identify the meaning of the ambiguous terms in a way that allows the system to efficiently provide a relevant answer in real time.

SUMMARY

Methods and systems are herein provided for identifying a meaning of an ambiguous term in a natural language query. Often, terms that are on their own ambiguous have a clearer meaning when other terms from the query are taken into account. For example, on its own "Patriot" may render itself to a number of interpretations, but in the context of the query "When is the Patriot Game on TNT?," it becomes clear that the user is referring to the movie "Patriot Games."

In some aspects, the methods and systems are provided herein for a media guidance application for identifying a meaning of an ambiguous term in a natural language query. The media guidance application isolates a first term and a second term from a query received from a user. For example, the media guidance application may parse the query "When is the Patriot Game on TNT?" and isolate the terms "Patriot" and "Game" from the query. In some embodiments, the media guidance application identifies a predicted syntax based on the command term or question word to identify the likely use of each word. For example, the command term or question word in "When is the Patriot Game on TNT?" may be "When is."

The media guidance application identifies, in a knowledge graph, a first plurality of candidate components associated with the first term. The first term having more than one candidate component indicates the first term has an ambiguous meaning. For example, the media guidance application may search the knowledge graph for components of the knowledge graph for terms similar to the first term. In some embodiments, the media guidance application identifies candidate components by identifying components that include the first term such as identifying the components "The Patriot," "Patriots," "Patriot Games," and "Patriot: The Game" from the term "Patriot."

The media guidance application identifies, in the knowledge graph, a second plurality of identified candidate components associated with the second term. The second term having more than one candidate component indicates the second term has an ambiguous meaning. For example, the media guidance application may search the knowledge graph for components of the knowledge graph for terms similar to the second term. In some embodiments, the media guidance application identifies candidate components based on associated metadata such as identifying the components "Video Games," "Sports," "Patriot Games," and "Patriot: The Game" from the term "Game" by finding the term included in the metadata description for each component.

The media guidance application matches each candidate component of the first plurality of candidate components to each candidate component of the second plurality of candidate components to form a plurality of pairs. For example, the media guidance application may determine a list of pairs of candidate components such as "The Patriot" and "Video Games," "The Patriot" and "Patriot: The Game," "Patriot Games" and "Sports," and more. In some embodiments, the media guidance application determines all possible pairs based on the identified candidate components. In some embodiments, a candidate component is paired with itself if associated with both the first and second term. For example, "Patriot Games" was identified for both terms and so a pair may be the single candidate component "Patriot Games."

The media guidance application determines a strength of association for each pair in the plurality of pairs. For example, the media guidance application may determine that "The Patriot" and "Video Games" have a strong association, and "Patriot Games" and "Sports" have a weak association. In some embodiments, the strength of association is a value representative of a distance determined by values associated with the edges between nodes. While both "The Patriot" and "Video Games" and "Patriot Games" and "Sports" are only a node apart, if the edges between each node add up to a smaller sum, the total distance is smaller. In some embodiments, the strength of association is a category that is determined by a threshold distance such as a "Strong" association if the nodes are below the threshold and a "Weak" association if the nodes are above the threshold.

The media guidance application filters the plurality of pairs by the strength of association for each pair. In some embodiments, the media guidance application filters the plurality of pairs by identifying a first pair of the plurality of pairs, determining whether the first pair has a strength of association that is below a required threshold, excluding the first pair from the filtered plurality of pairs in response to determining that the strength of association is below the required threshold, and including the first pair in the filtered plurality of pairs in response to determining that the strength of association is not below the required threshold. For example, the media guidance application may remove the pair of "Patriot Games" and "Sports" based on the weak association between the candidate components, which indicates that the distance between the candidate components is not within the threshold distance.

In some embodiments, the media guidance application determines the required threshold based on the strength of association for each of the plurality of pairs, adjust the required threshold based on the filtered plurality of pairs, and filter the plurality of pairs based on the adjusted required threshold. For example, the media guidance application may set a first threshold based on an average distance between candidate components, and after filtering the plurality of pairs, determine that the threshold needs to be lower to further narrow down the options, and adjust the threshold accordingly.

The media guidance application determines a plurality of possible meanings associated with the query based on the filtered plurality of pairs. In some embodiments, the media guidance application determines a possible meaning by identifying a relevant media asset based on the pair of candidate components. For example, the media guidance application may determine that both of the pairs "The Patriot" and "Video Games," and "The Patriot" and "The Patriot: The Game" are referring to the media asset "The Patriot: The Game," as a video game associated with the movie, "The Patriot."

In some embodiments, the media guidance application isolates a command term from the query received from the user and determines the plurality of possible meanings associated with the query based on the filtered plurality of pairs and the command term. For example, the media guidance application may isolate the term "When is" as a command term and determine that all possible meanings must have an associated action of displaying program information relating to time. In some embodiments, the media guidance application determines the plurality of possible meanings by determining a plurality of possible meanings associated with the command term, where each of the possible meanings is associated with expected terms, comparing the expected terms associated with each possible meaning associated with the command term to the filtered plurality of pairs, filtering out a subset of the plurality of pairs based on the comparison, and determining the plurality of possible meanings associated with the query based on the subset of the plurality of pairs and the expected terms. For example, the media guidance application may expect any query containing the command term "When is" to also identify a broadcast media asset if the query also contains the word "on," and search the media assets determined to be related to the plurality of pairs so that only the broadcast media assets are used in the plurality of possible meanings.

In some embodiments, the media guidance application isolates a third term from the query received from the user and determines the plurality of possible meanings associated with the query based on the filtered plurality of pairs and the third term. For example, the media guidance application may isolate the term "TNT" from the query and limit the possible meanings to relate to media assets associated with the television channel TNT. In some embodiments, the media guidance application determines the plurality of possible meanings by identifying, in the knowledge graph, a third candidate component associated with the third term, identifying expected terms associated with the third candidate component, comparing the expected terms associated with the third candidate component to each pair in the filtered plurality of pairs, filtering out a subset of the plurality of pairs based on the comparison, and determining the plurality of possible meanings associated with the query based on the subset of the plurality of pairs and the expected terms. For example, the media guidance application may isolate the term "TNT" from the query, determine that there is an expectation that a term from the query is a broadcast media asset associated with the television channel TNT and limit the plurality of pairs to only those with candidate components with metadata identifying that it is broadcast on TNT.

In some embodiments, the media guidance application receives feedback on the accuracy for the plurality of possible meanings associated with the query and adjusts the required threshold based on the received feedback. For example, the media guidance application may receive feedback from the user that none of the results are relevant to the user's query, and the media guidance application may raise the threshold so that fewer items are likely to be filtered out.

The media guidance application selects a meaning from the plurality of possible meanings associated with the query. For example, the media guidance application may identify the media assets "Patriot Games," which is playing on TNT at 8 pm, "Patriots vs. Jets," which is playing on FOX at 10 pm, and "The Patriot: The Game," which is in the Game Store, from the listed pairs, and determine to display program information about the movie "Patriot Games" playing on TNT at 8 pm because it is the only one of the media assets playing on TNT.

In some embodiments, the media guidance application selects the meaning for the query by ranking the plurality of possible meanings according to a user preference and automatically determining the meaning for the query based on the ranking. For example, if the user preferences show that the user loves Actions Movies, and hates Sports and Video Games, the media guidance application may rank "Patriot Games" higher than "Patriots vs. Jets" and "The Patriot: The Game," and select "Patriot Games" as the meaning. In some embodiments, the media guidance application selects the meaning for the query by generating for display the plurality of possible meanings associated with query, and receiving a user selection of the meaning for the query. For example, the media guidance application may provide the user with the options of "Patriot Games," "Patriots vs. Jets," and "The Patriot: The Game" and allow the user to select one of the three options.

Conventional systems do not consider multiple interpretations of a query. Moreover, they do not do so by considering multiple entities across the query. This means that if the system identifies the word "Patriot" in a query, it is equally likely that the system will understand the user to have referred to "Patriot Games" the movie, "The Patriot" the movie, or the upcoming Patriots' game against the Jets. Often, systems address this using additional information such as determining which of the three possible media assets is most popular or fits within the user's preference profile. The methods and systems provided herein discuss identifying the possible meanings of the query using the information provided by the query itself. By considering the additional words such as "Game," the system can start refining the possible meanings of the query to refer to either "Patriot Games" or the upcoming Patriots' game against the Jets. By considering that the query also mentioned the television channel TNT or the fact that a question was asked about time, the system can further narrow down the possible meaning to the movie "Patriot Games." The methods and systems provided herein use the knowledge graph to allow the system to understand how the items of the query are related to one another and ensure that the system provides more relevant results in response to natural language queries.

It should be noted that the systems, methods, apparatuses, and/or aspects described above may be applied to, or used in accordance with, other systems, methods, apparatuses, and/or aspects.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 10 is a flowchart of illustrative steps involved in identifying a meaning of an ambiguous term, in accordance with some embodiments of the disclosure.

DETAILED DESCRIPTION

Methods and systems for identifying a meaning of an ambiguous term in a natural language query are described herein. The media guidance application isolates first and second terms from a query received from a user and identifies, in a knowledge graph, first and second pluralities of candidate components associated with the first and second terms. The first and second terms each having multiple candidate components indicates that the first and second terms have ambiguous meanings. The media guidance application matches each candidate component of the first and second pluralities of candidate components to form a plurality of pairs and determines strength of association for each pair in the plurality of pairs. The media guidance application filters the plurality of pairs by strength of association for each pair and determines a plurality of possible meanings based on the filtered plurality of pairs. The media guidance application selects a meaning from the plurality of possible meanings.

The natural language query may be in the form of textual, verbal, or any other suitable mode of communication. The natural language query includes one or more natural language terms. One or more of the natural language terms may have more than one meaning, rendering the terms ambiguous. The natural language terms may be present in a knowledge graph that is a collection of data organized to store relationships between different pieces of information. A strength of association between terms may be associated with the distance between two nodes in the knowledge graph. Distance between nodes may be calculated by counting the number of neighboring nodes between two nodes. Distance between nodes may also be calculated using a distance value associated with each edge that connects two nodes and summing each distance value along the path between two non-neighboring nodes. Command terms may be a single word with an associated meaning such as "play" or "show." Command terms may be phrases or words associated with a sentence structure such as "how" or "when." The third term may be another term that provides additional information through metadata associated with candidate components of the knowledge graph.

Figure 1:
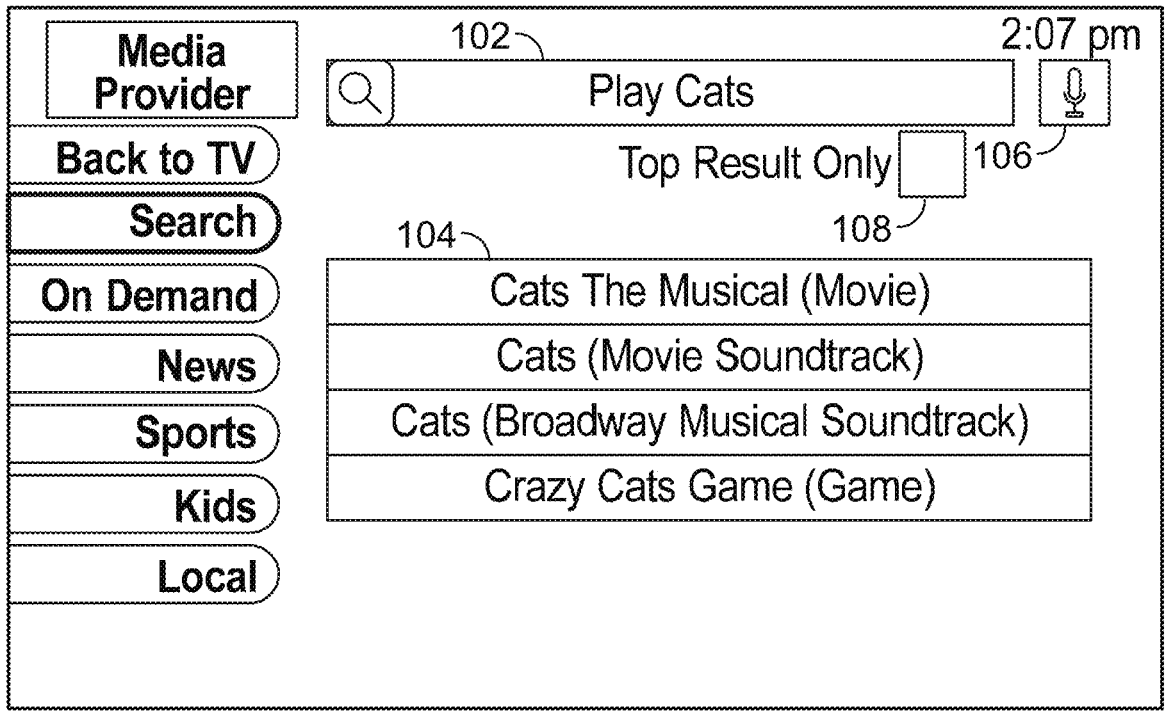
FIG. 1 shows an illustrative example of a display of user equipment displaying the results of a natural language query, including an ambiguous term, in accordance with some embodiments of the disclosure.

FIG. 1 shows an illustrative example of a display 100 of user equipment displaying the results of a natural language query including an ambiguous term. The user equipment may be a television set-top box, a mobile phone, a tablet computer, a wearable device, or another suitable user equipment. On receiving query 102, "Play Cats," through microphone 106, the user equipment may display results 104. Results 104 may include program information and/or descriptions of the media asset based on relevant metadata in order to help the user identify the relevant result. Results may also include images, sounds, or other non-textual information to further help identify the relevant media asset. For example, results 104 includes "Cats The Musical (Movie)," "Cats (Movie Soundtrack)," "Cats (Broadway Musical Soundtrack)," and "Crazy Cats Game (Game)." Selecting option 108 includes only the top result instead of including all entries from results 104.

Selecting an entry from results 104 may initiate an associated action. There may be a default associated action if a command term is not identified. An associated action may include displaying more information about a media asset, starting the playback of a media asset, opening up a relevant webpage, changing a setting, updating a user profile, or another suitable action. For example, for query 102, "Play" indicates a command term to play the media asset for the query.

Figure 2:
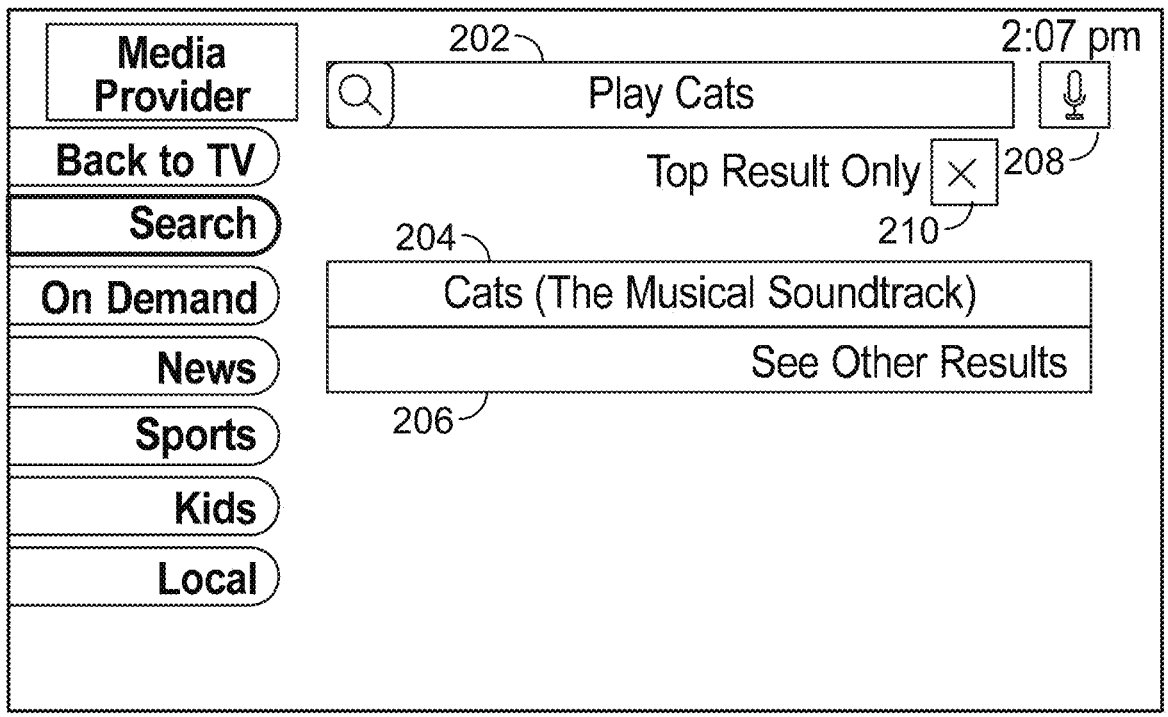
FIG. 2 shows an illustrative example of a display of user equipment displaying the result of a natural language query, including an ambiguous term, in accordance with some embodiments of the disclosure.

FIG. 2 shows an illustrative example of a display 200 of user equipment displaying the result of a natural language query including an ambiguous term. On receiving query 202, "Play Cats," via microphone 208, the user equipment may display results 204. The results are limited to one entry since option 208 for the top result only is selected. The user may select option 206 to see other entries from results 204. The top result from results 204 may be chosen based on ranking the results using rules based on preset rules or user preferences. The user preferences may be automatically recorded or manually set by user. The preset rules may include a set of business rules, such as prioritizing advertised content over non-advertised content. In this example, the user preferences indicate the user likes musical soundtracks. As such, the top result is selected to be "Cats (The Musical Soundtrack)."

Figure 3:
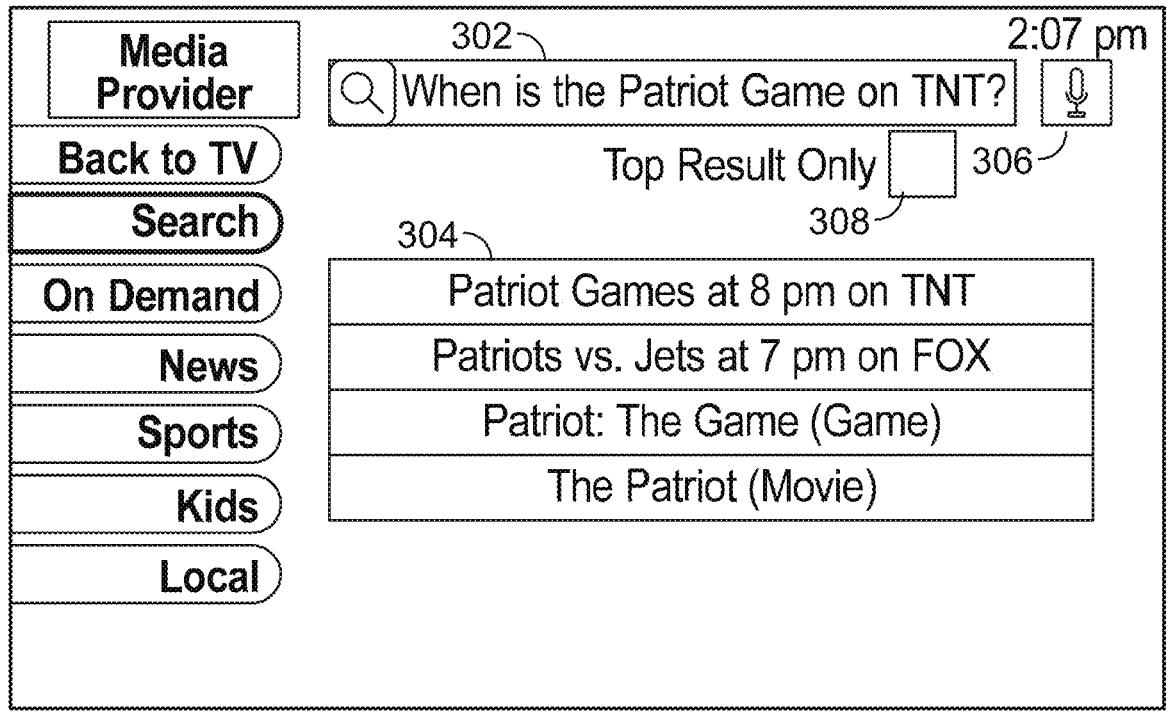
FIG. 3 shows an illustrative example of a display of user equipment displaying the results of a natural language query, including ambiguous terms, in accordance with some embodiments of the disclosure.

FIG. 3 shows an illustrative example of a display 300 of user equipment displaying the results of a natural language query including ambiguous terms. On receiving query 302, "When is the Patriot Game on TNT?," via microphone 306, the user equipment displays results 304. The user may select option 308 to see only the top result. The user equipment may parse the query "When is the Patriot Game on TNT?" and isolate the terms "Patriot" and "Game" from the query. The user equipment may identify a predicted syntax based on the command term or question word to identify the likely use of each word. For example, the command term or question word in "When is the Patriot Game on TNT?" may be "When is." The user equipment may identify candidate components by identifying components that include the first term such as identifying the components "The Patriot,"

"Patriots," "Patriot Games," and "Patriot: The Game" from the term "Patriot." The user equipment may search the knowledge graph for components of the knowledge graph for terms similar to the second term. The user equipment may identify candidate components based on associated metadata such as identifying the components "Video Games," "Sports," "Patriot Games," and "Patriot: The Game" from the term "Game" by finding the term included in the metadata description for each component. The user equipment may determine a list of pairs of candidate components such as "The Patriot" and "Video Games," "The Patriot" and "Patriot: The Game," "Patriot Games" and "Sports," and more. The user equipment may determine a strength of association for each pair in the plurality of pairs. The user equipment may determine that "The Patriot" and "Video Games" have a strong association, and "Patriot Games" and "Sports" have a weak association based on the distance between each pair. The user equipment may generate for display the plurality of possible meanings associated with query 302. Accordingly, the user equipment may provide results 304 including "Patriot Games," "Patriots vs. Jets," "The Patriot: The Game," and "The Patriot (Movie)."

Figure 4:
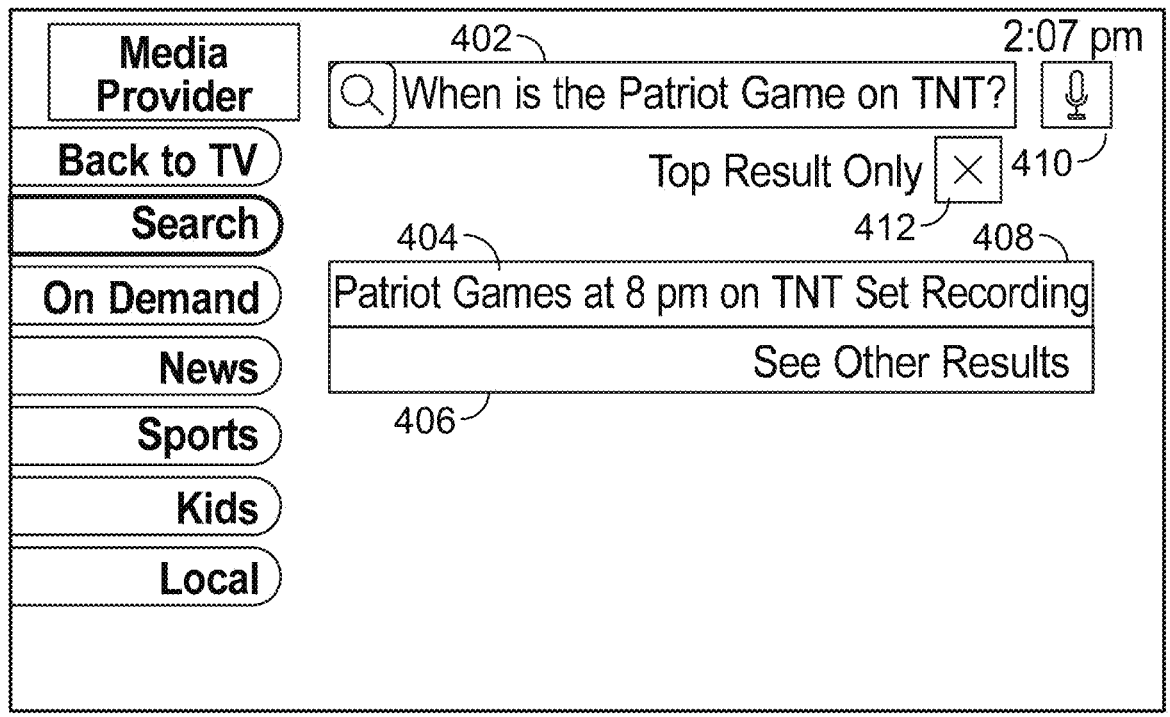
FIG. 4 shows an illustrative example of a display of user equipment displaying the result of a natural language query, including ambiguous terms, in accordance with some embodiments of the disclosure.

FIG. 4 shows an illustrative example of a display 400 of user equipment displaying the result of a natural language query, including ambiguous terms. On receiving query 402, "When is the Patriot Game on TNT?" via microphone 410, the user equipment displays result 404. The user may select option 412 to see only the top result. The user may select option 408 to set a recording for result 404. The user may select option 406 to see other search results hidden due to the user's selection of option 412.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory, including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front-facing screen and a rear-facing screen, multiple front screens, or multiple angled screens. In some embodiments, the user equipment device may have a front-facing camera and/or a rear-facing camera. On these user equipment devices, users may be able to navigate among and locate the same content available through a television. Consequently, media guidance may be available on these devices as well. The guidance provided may be for content available only through a television, for content available only through one or more other types of user equipment devices, or for content available both through a television and one or more of the other types of user equipment devices. The media guidance applications may be provided as on-line applications (i.e., provided on a website), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 5:
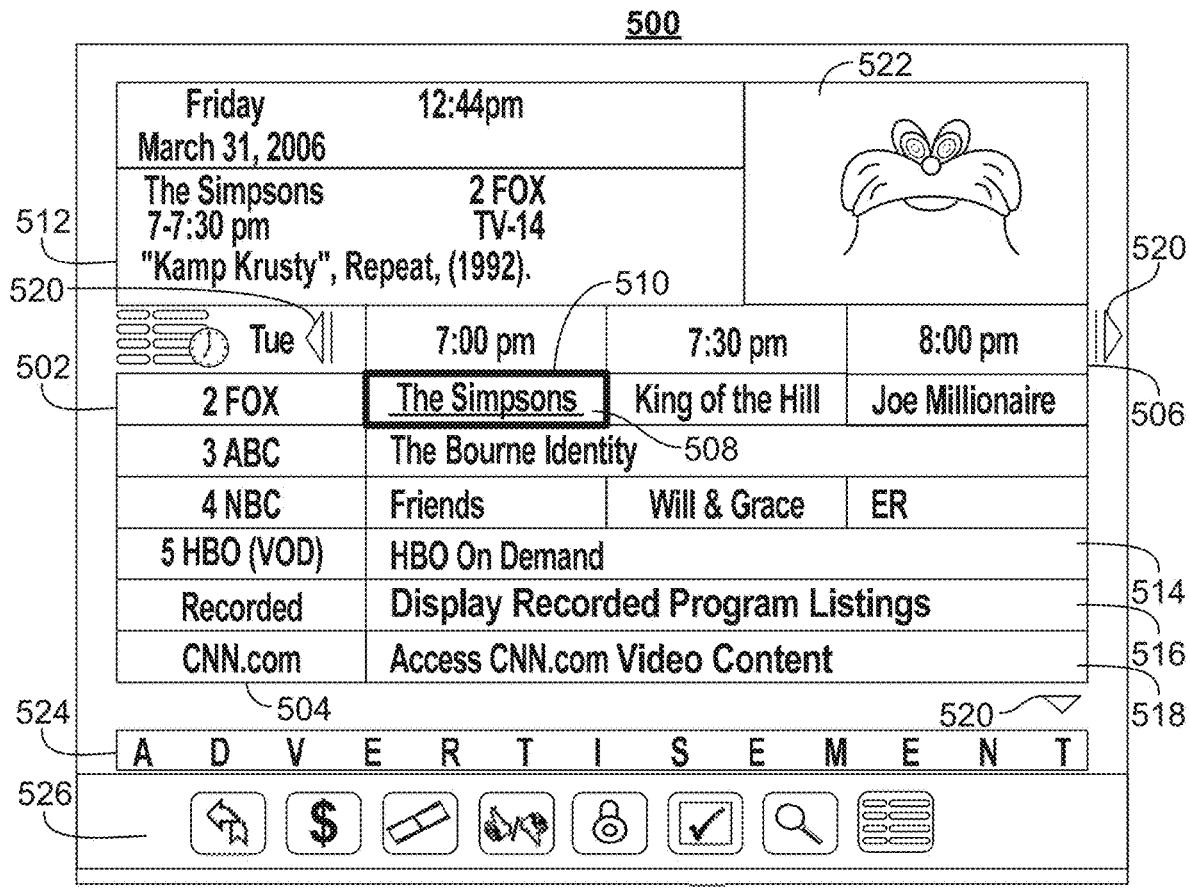
FIG. 5 shows an illustrative example of a display screen generated by a media guidance application, in accordance with some embodiments of the disclosure.
Figure 6:
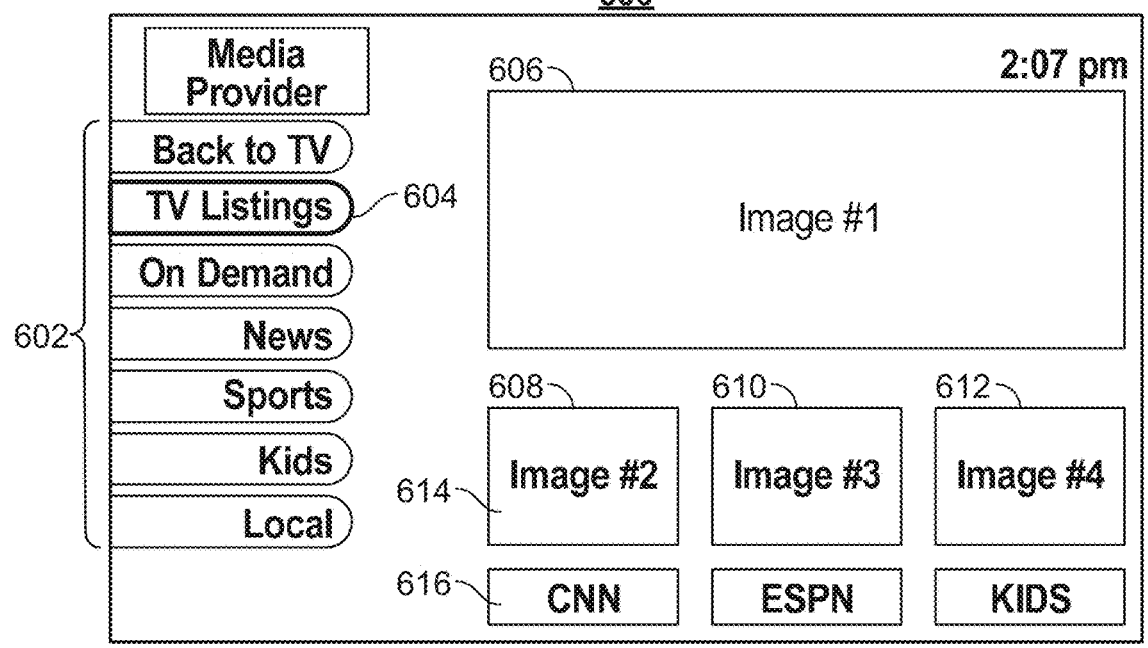
FIG. 6 shows another illustrative example of a display screen generated by a media guidance application, in accordance with some embodiments of the disclosure.

FIGS. 5-6 show illustrative display screens that may be used to provide media guidance data. The display screens shown in FIGS. 5-6 may be implemented on any suitable user equipment device or platform. While the displays of FIGS. 5-6 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 5 shows an illustrative grid of a program listings display 500 arranged by time and channel that also enables access to different types of content in a single display. Display 500 may include grid 502 with (1) a column of channel/content type identifiers 504, where each channel/content type identifier (which is a cell in the column) identifies a different channel or content type available; and (2) a row of time identifiers 506, where each time identifier (which is a cell in the row) identifies a time block of programming. Grid 502 also includes cells of program listings, such as program listing 508, where each listing provides the title of the program provided on the listing's associated channel and time. With a user input device, a user can select program listings by moving highlight region 510. Information relating to the program listing selected by highlight region 510 may be provided in program information region 512. Region 512 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and not provided according to a schedule). Non-linear programming may include content from different content sources, including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L. P. et al., and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 502 may provide media guidance data for non-linear programming including on-demand listing 514, recorded content listing 516, and Internet content listing 518. A display combining media guidance data for content from different types of content sources is sometimes referred to as a "mixed-media" display. Various permutations of the types of media guidance data that may be displayed that are different than display 500 may be based on user selection or guidance application definition (e.g., a display of only recorded and broadcast listings, only on-demand and broadcast listings, etc.). As illustrated, listings 514, 516, and 518 are shown as spanning the entire time block displayed in grid 502 to indicate that selection of these listings may provide access to a display dedicated to on-demand listings, recorded listings, or Internet listings, respectively. In some embodiments, listings for these content types may be included directly in grid 502. Additional media guidance data may be displayed in response to the user selecting one of the navigational icons 520. (Pressing an arrow key on a user input device may affect the display in a similar manner as selecting navigational icons 520.)

Display 500 may also include video region 522 and options region 526. Video region 522 may allow the user to view and/or preview programs that are currently available, will be available, or were available to the user. The content of video region 522 may correspond to, or be independent from, one of the listings displayed in grid 502. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 526 may allow the user to access different types of content, media guidance application displays, and/or media guidance application features. Options region 526 may be part of display 500 (and other display screens described herein), or may be invoked by a user by selecting an on-screen option or pressing a dedicated or assignable button on a user input device. The selectable options within options region 526 may concern features related to program listings in grid 502 or may include options available from a main menu display. Features related to program listings may include searching for other air times or ways of receiving a program, recording a program, enabling series recording of a program, setting a program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.) and/or obtain information about the user from other sources that the media guidance application may access. As a result, a user can be provided with a unified guidance application experience across the user's different user equipment devices. This type of user experience is described in greater detail below in connection with FIG. 8. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 6. Video mosaic display 600 includes selectable options 602 for content information organized based on content type, genre, and/or other organization criteria. In display 600, television listings option 604 is selected, thus providing listings 606, 608, 610, and 612 as broadcast program listings. In display 600 the listings may provide graphical images, including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 608 may include more than one portion, including media portion 614 and text portion 616. Media portion 614 and/or text portion 616 may be selectable to view content in full screen or to view information related to the content displayed in media portion 614 (e.g., to view listings for the channel that the video is displayed on).

The listings in display 600 are of different sizes (i.e., listing 606 is larger than listings 608, 610, and 612), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 7:
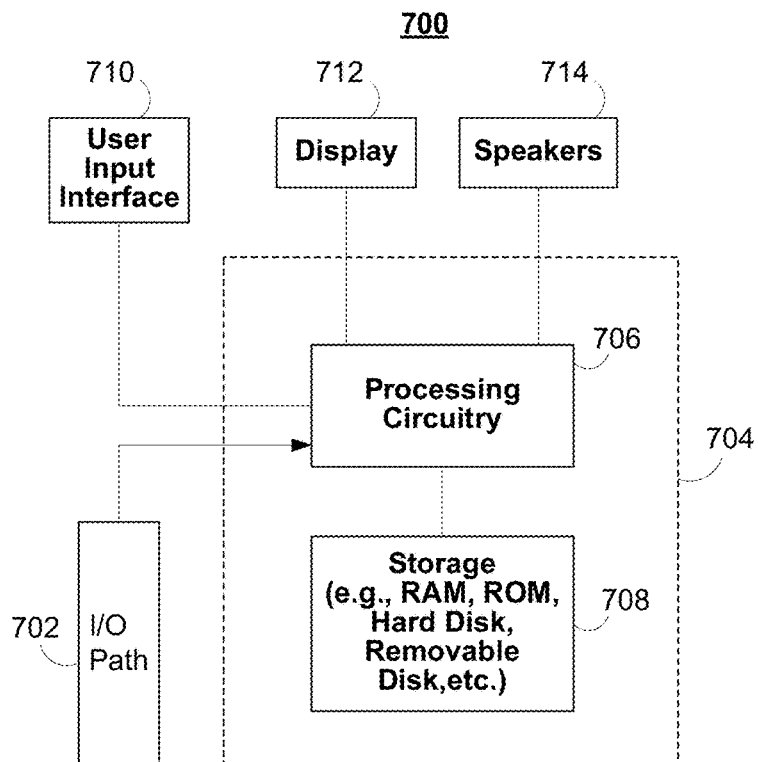
FIG. 7 is a block diagram of an illustrative user equipment device, in accordance with some embodiments of the disclosure.

Users may access content and the media guidance application (and its display screens described above and below) from one or more of their user equipment devices. FIG. 7 shows a generalized embodiment of illustrative user equipment device 700. More specific implementations of user equipment devices are discussed below in connection with FIG. 8. User equipment device 700 may receive content and data via input/output (hereinafter "I/O") path 702. I/O path 702 may provide content (e.g., broadcast programming, on-demand programming, Internet content, content available over a local area network (LAN) or wide area network (WAN), and/or other content) and data to control circuitry 704, which includes processing circuitry 706 and storage 708. Control circuitry 704 may be used to send and receive commands, requests, and other suitable data using I/O path 702. I/O path 702 may connect control circuitry 704 (and specifically processing circuitry 706) to one or more communications paths (described below). I/O functions may be provided by one or more of these communications paths, but are shown as a single path in FIG. 7 to avoid overcomplicating the drawing.

Control circuitry 704 may be based on any suitable processing circuitry such as processing circuitry 706. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 704 executes instructions for a media guidance application stored in memory (i.e., storage 708). Specifically, control circuitry 704 may be instructed by the media guidance application to perform the functions discussed above and below. For example, the media guidance application may provide instructions to control circuitry 704 to generate the media guidance displays. In some implementations, any action performed by control circuitry 704 may be based on instructions received from the media guidance application.

In client-server-based embodiments, control circuitry 704 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which are described in more detail in connection with FIG. 8). In addition, communications circuitry may include circuitry that enables peer-to-peer communication of user equipment devices, or communication of user equipment devices in locations remote from each other (described in more detail below).

Memory may be an electronic storage device provided as storage 708 that is part of control circuitry 704. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 708 may be used to store various types of content described herein as well as media guidance data described above. Nonvolatile memory may also be used (e.g., to launch a boot-up routine and other instructions). Cloud-based storage, described in relation to FIG. 8, may be used to supplement storage 708 or instead of storage 708.

Control circuitry 704 may include video-generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 704 may also include scaler circuitry for upconverting and downconverting content into the preferred output format of the user equipment 700. Circuitry 704 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including, for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 708 is provided as a separate device from user equipment 700, the tuning and encoding circuitry (including multiple tuners) may be associated with storage 708.

A user may send instructions to control circuitry 704 using user input interface 710. User input interface 710 may be any suitable user interface, such as a remote control, mouse, trackball, keypad, keyboard, touch screen, touchpad, stylus input, joystick, voice recognition interface, or other user input interfaces. Display 712 may be provided as a stand-alone device or integrated with other elements of user equipment device 700. For example, display 712 may be a touchscreen or touch-sensitive display. In such circumstances, user input interface 710 may be integrated with or combined with display 712. Display 712 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 712 may be HDTV-capable. In some embodiments, display 712 may be a 3D display, and the interactive media guidance application and any suitable content may be displayed in 3D. A video card or graphics card may generate the output to the display 712. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 704. The video card may be integrated with the control circuitry 704. Speakers 714 may be provided as integrated with other elements of user equipment device 700 or may be stand-alone units. The audio component of videos and other content displayed on display 712 may be played through speakers 714. In some embodiments, the audio may be distributed to a receiver (not shown), which processes and outputs the audio via speakers 714.

The guidance application may be implemented using any suitable architecture. For example, it may be a stand-alone application wholly implemented on user equipment device 700. In such an approach, instructions of the application are stored locally (e.g., in storage 708), and data for use by the application is downloaded on a periodic basis (e.g., from an out-of-band feed, from an Internet resource, or using another suitable approach). Control circuitry 704 may retrieve instructions of the application from storage 708 and process the instructions to generate any of the displays discussed herein. Based on the processed instructions, control circuitry 704 may determine what action to perform when input is received from input interface 710. For example, movement of a cursor on a display up/down may be indicated by the processed instructions when input interface 710 indicates that an up/down button was selected.

In some embodiments, the media guidance application is a client-server-based application. Data for use by a thick or thin client implemented on user equipment device 700 is retrieved on-demand by issuing requests to a server remote to the user equipment device 700. In one example of a client-server-based guidance application, control circuitry 704 runs a web browser that interprets web pages provided by a remote server. For example, the remote server may store the instructions for the application in a storage device. The remote server may process the stored instructions using circuitry (e.g., control circuitry 704) and generate the displays discussed above and below. The client device may receive the displays generated by the remote server and may display the content of the displays locally on equipment device 700. This way, the processing of the instructions is performed remotely by the server while the resulting displays are provided locally on equipment device 700. Equipment device 700 may receive inputs from the user via input interface 710 and transmit those inputs to the remote server for processing and generating the corresponding displays. For example, equipment device 700 may transmit a communication to the remote server indicating that an up/down button was selected via input interface 710. The remote server may process instructions in accordance with that input and generate a display of the application corresponding to the input (e.g., a display that moves a cursor up/down). The generated display is then transmitted to equipment device 700 for presentation to the user.

In some embodiments, the media guidance application is downloaded and interpreted or otherwise run by an interpreter or virtual machine (run by control circuitry 704). In some embodiments, the guidance application may be encoded in the ETV Binary Interchange Format (EBIF), received by control circuitry 704 as part of a suitable feed, and interpreted by a user agent running on control circuitry 704. For example, the guidance application may be an EBIF application. In some embodiments, the guidance application may be defined by a series of JAVA-based files that are received and run by a local virtual machine or other suitable middleware executed by control circuitry 704. In some of such embodiments (e.g., those employing MPEG-2 or other digital media encoding schemes), the guidance application may be, for example, encoded and transmitted in an MPEG-2 object carousel with the MPEG audio and video packets of a program.

Figure 8:
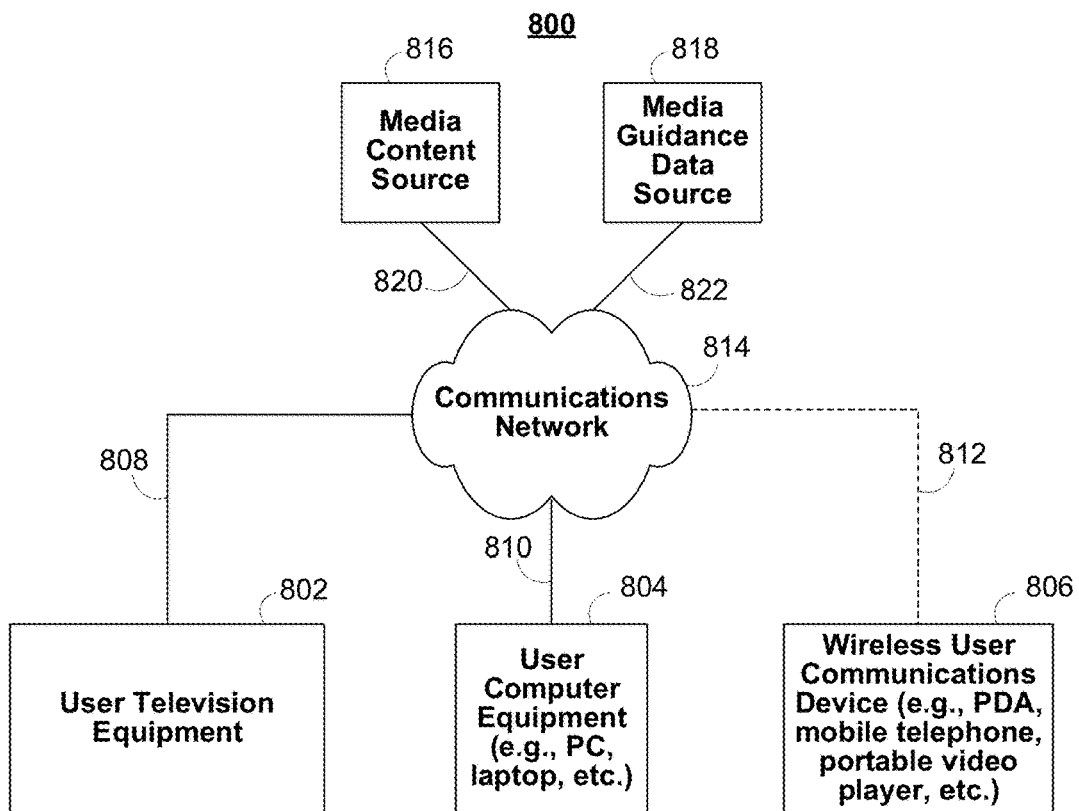
FIG. 8 is a block diagram of an illustrative media system, in accordance with some embodiments of the disclosure.

User equipment device 700 of FIG. 7 can be implemented in system 800 of FIG. 8 as user television equipment 802, user computer equipment 804, wireless user communications device 806, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 7 may not be classified solely as user television equipment 802, user computer equipment 804, or a wireless user communications device 806. For example, user television equipment 802 may, like some user computer equipment 804, be Internet-enabled, allowing for access to Internet content, while user computer equipment 804 may, like some television equipment 802, include a tuner allowing for access to television programming. The media guidance application may have the same layout on various different types of user equipment or may be tailored to the display capabilities of the user equipment. For example, on user computer equipment 804, the guidance application may be provided as a web site accessed by a web browser. In another example, the guidance application may be scaled down for wireless user communications devices 806.

In system 800, there is typically more than one of each type of user equipment device but only one of each is shown in FIG. 8 to avoid overcomplicating the drawing. In addition, each user may utilize more than one type of user equipment device and also more than one of each type of user equipment device.

In some embodiments, a user equipment device (e.g., user television equipment 802, user computer equipment 804, wireless user communications device 806) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on his or her personal computer at his or her office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 814. Namely, user television equipment 802, user computer equipment 804, and wireless user communications device 806 are coupled to communications network 814 via communications paths 808, 810, and 812, respectively. Communications network 814 may be one or more networks including the Internet, a mobile phone network, mobile voice or data network (e.g., a 4G or LTE network), cable network, public switched telephone network, or other types of communications network or combinations of communications networks. Paths 808, 810, and 812 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 812 is drawn with dotted lines to indicate that, in the exemplary embodiment shown in FIG. 8, it is a wireless path and paths 808 and 810 are drawn as solid lines to indicate they are wired paths (although these paths may be wireless paths, if desired). Communications with the user equipment devices may be provided by one or more of these communications paths, but are shown as a single path in FIG. 8 to avoid overcomplicating the drawing.

Although communications paths are not drawn between user equipment devices, these devices may communicate directly with each other via communication paths, such as those described above in connection with paths 808, 810, and 812, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 814.

System 800 includes content source 816 and media guidance data source 818 coupled to communications network 814 via communication paths 820 and 822, respectively. Paths 820 and 822 may include any of the communication paths described above in connection with paths 808, 810, and 812. Communications with the content source 816 and media guidance data source 818 may be exchanged over one or more communications paths, but are shown as a single path in FIG. 8 to avoid overcomplicating the drawing. In addition, there may be more than one of each of content source 816 and media guidance data source 818, but only one of each is shown in FIG. 8 to avoid overcomplicating the drawing. (The different types of each of these sources are discussed below.) If desired, content source 816 and media guidance data source 818 may be integrated as one source device. Although communications between sources 816 and 818 with user equipment devices 802, 804, and 806 are shown as through communications network 814, in some embodiments, sources 816 and 818 may communicate directly with user equipment devices 802, 804, and 806 via communication paths (not shown) such as those described above in connection with paths 808, 810, and 812.

Content source 816 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 816 may be the originator of content (e.g., a television broadcaster, a Webcast provider, etc.) or may not be the originator of content (e.g., an on-demand content provider, an Internet provider of content of broadcast programs for downloading, etc.). Content source 816 may include cable sources, satellite providers, on-demand providers, Internet providers, over-the-top content providers, or other providers of content. Content source 816 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 818 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 818 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 818 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 818 may provide user equipment devices 802, 804, and 806 with the media guidance application itself or with software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood that a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 708, and executed by control circuitry 704 of a user equipment device 700. In some embodiments, media guidance applications may be client-server applications where only a client application resides on the user equipment device, and server application resides on a remote server. For example, media guidance applications may be implemented partially as a client application on control circuitry 704 of user equipment device 700 and partially on a remote server as a server application (e.g., media guidance data source 818) running on control circuitry of the remote server. When executed by control circuitry of the remote server (such as media guidance data source 818), the media guidance application may instruct the control circuitry to generate the guidance application displays and transmit the generated displays to the user equipment devices. The server application may instruct the control circuitry of the media guidance data source 818 to transmit data for storage on the user equipment. The client application may instruct control circuitry of the receiving user equipment to generate the guidance application displays.

Content and/or media guidance data delivered to user equipment devices 802, 804, and 806 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally, or alternatively, provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 800 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 8.

In one approach, user equipment devices may communicate with each other within a home network. User equipment devices can communicate with each other directly via short-range point-to-point communication schemes described above, via indirect paths through a hub or other similar device provided on a home network, or via communications network 814. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 816 to access content. Specifically, within a home, users of user television equipment 802 and user computer equipment 804 may access the media guidance application to navigate among and locate desirable content. Users may also access the media guidance application outside of the home using wireless user communications devices 806 to navigate among and locate desirable content.

In a fourth approach, user equipment devices may operate in a cloud-computing environment to access cloud services. In a cloud-computing environment, various types of computing services for content sharing, storage or distribution (e.g., video sharing sites or social networking sites) are provided by a collection of network-accessible computing and storage resources, referred to as "the cloud." For example, the cloud can include a collection of server-computing devices, which may be located centrally or at distributed locations, that provide cloud-based services to various types of users and devices connected via a network such as the Internet via communications network 814. These cloud resources may include one or more content sources 816 and one or more media guidance data sources 818. In addition, or in the alternative, the remote computing sites may include other user equipment devices, such as user television equipment 802, user computer equipment 804, and wireless user communications device 806. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 804 or wireless user communications device 806 having content capture feature. Alternatively, the user can first transfer the content to a user equipment device, such as user computer equipment 804. The user equipment device storing the content uploads the content to the cloud using a data transmission service on communications network 814. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 7.

As referred to herein, the term "in response to" refers to "initiated as a result of." For example, a first action being performed in response to a second action may include interstitial steps between the first action and the second action. As referred to herein, the term "directly in response to" refers to "caused by." For example, a first action being performed directly in response to a second action may not include interstitial steps between the first action and the second action.

Figure 9:
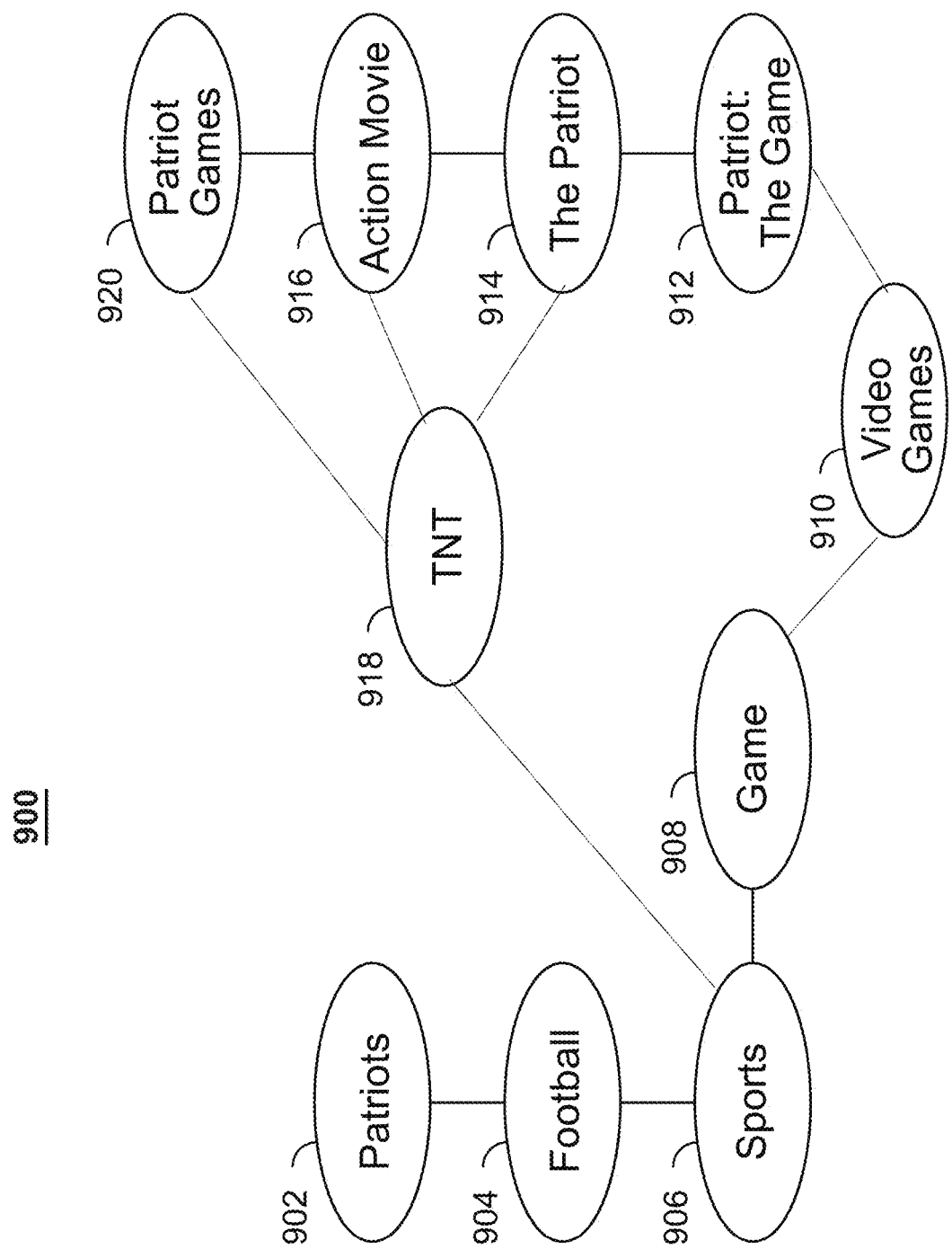
FIG. 9 shows an illustrative embodiment of a portion of a knowledge graph, in accordance with some embodiments of the disclosure.

FIG. 9 shows an illustrative embodiment of a portion of a knowledge graph, in accordance with some embodiments of the disclosure. Knowledge graph 900 may include a possibly large number of entities that are represented as nodes in the graph. For example, knowledge graph 900 may contain, among others, nodes 902-920. The nodes of knowledge graph 900 may be connected by edges, and the presence of an edge in the graph may represent that there is an association between the entities represented by the nodes in the graph. Knowledge graph 900 may be stored using storage circuitry 708. Knowledge graph 900 may be stored locally on user equipment device 700 or stored remotely and accessed through communications network 814. Knowledge graph 900 may be stored entirely in one location, or be split into sections and each section stored at one of a plurality of locations. User equipment device 700 may locally cache frequently used portions of the knowledge graph for quick retrieval.

Knowledge graph 900 is composed of nodes and edges. In some embodiments, knowledge graph 900 may be represented as pointer tables in storage circuitry 708. In some embodiments, data structures such as trees, bi-directional graphs, buckets, or arrays may be used to represent knowledge graph 900 in storage circuitry 708.

Although knowledge graph 900 is discussed in relation to FIG. 9 as being composed of nodes and edges, knowledge graph 900 may be any collection of data that represents objects and relationships between objects. Knowledge graph 900 may include databases, lists, and collections which represent objects and their associated relationships. Knowledge graph 900 may not necessarily use nodes and edges to represent objects and their relationships. Knowledge graph 900, as shown in FIG. 9, is merely an illustrative embodiment that may be used to represent objects and their relationships, and other representations may be used without departing from the scope of this invention. Knowledge graphs and their features are described in greater detail in U.S. patent application Ser. No. 14/501,504, filed Sep. 30, 2014, U.S. patent application Ser. No. 14/500,309, filed Sep. 29, 2014, and U.S. patent application Ser. No. 14/448,308, filed Jul. 31, 2014, which are hereby incorporated by reference herein in their entireties.

Each node in knowledge graph 900 may be associated with a candidate component or a term. For example, node 908 is associated with the term "Game" while node 920 is associated with the candidate component of the movie "Patriot Games." Each node may be associated with metadata. For example, node 912 and node 914 may be associated with metadata describing that both nodes relate to "The Patriot." Node 912 may refer to a video game based on the movie for node 914. An edge may be created between node 912 and node 914 to represent this similarity in metadata.

In some embodiments, edges may connect nodes of different categories. For example, node 918 relating to channel TNT may be connected to node 906 for Sports programming In some embodiments, nodes may be connected to a plurality of other nodes. For example, node 910 for video games may be connected to node 908 for Game and node 912 for a video game based on a movie.

In some embodiments, the media guidance application may identify a plurality of candidate components associated with a term by searching the knowledge graph 900 to identify a node corresponding to the term, and then identifying candidate components connected to the node corresponding to the term. For example, the media guidance application may identify that node 908 corresponds to the term "Game." The media guidance application may then determine that node 906 associated with "Sports" is a candidate component associated with the term. The media guidance application may further determine that node 904 is another candidate component associated with the term as node 904 associated with "Football" is connected to node 908 through node 906.

In some embodiments, the media guidance application may identify a plurality of candidate components associated with a term by comparing the term to the metadata associated with nodes in knowledge graph 900. For example, the media guidance application may compare the term "Patriot" with the metadata associated with nodes 914 and 920 to determine that both nodes 914 and 920 correspond to movies that are candidate components associated to the term "Patriot."

FIG. 10 is a flowchart of illustrative steps involved in identifying a meaning of an ambiguous term, in accordance with some embodiments of the disclosure. FIG. 10 presents a process for control circuitry (e.g., control circuitry 704) to identify a meaning of an ambiguous term in accordance with some embodiments of the disclosure. In some embodiments, this algorithm may be encoded on to non-transitory storage medium (e.g., storage device 708) as a set of instructions to be decoded and executed by processing circuitry (e.g., processing circuitry 706). Processing circuitry may, in turn, provide instructions to other sub-circuits contained within control circuitry 704, such as the tuning, video generating, encoding, decoding, encrypting, decrypting, scaling, analog/digital conversion circuitry, and the like.

At step 1002, control circuitry 704 isolates a first term and a second term from a query received from a user. For example, control circuitry 704 may parse the query "When is Patriot Game on TNT" and isolate the terms "Patriot" and "Game" from the query. In some embodiments, control circuitry 704 identifies a predicted syntax based on the command term or question word to identify the likely use of each word. For example, the command term or question word in "When is Patriot Game on TNT" may be "When is." Process 1000 proceeds to step 1004.

At step 1004, control circuitry 704 identifies, in a knowledge graph 900, a first plurality of candidate components associated with the first term. The first term having more than one candidate component indicates the first term has an ambiguous meaning. For example, control circuitry 704 may search the knowledge graph 900 for components of the knowledge graph 900 for terms similar to the first term. In some embodiments, control circuitry 704 identifies candidate components by identifying component that include the first term such as identifying the components "The Patriot," "Patriots," "Patriot Games," and "Patriot: The Game" associated with nodes 914, 902, 920, and 912 respectively from the term "Patriot." Process 1000 proceeds to step 1006.

At step 1006, control circuitry 704 identifies, in the knowledge graph 900, a second plurality of identified candidate components associated with the second term. The second term having more than one candidate component indicates the second term has an ambiguous meaning. For example, control circuitry 704 may search the knowledge graph 900 for components of the knowledge graph 900 for terms similar to the second term. In some embodiments, control circuitry 704 identifies candidate components based on associated metadata such as identifying the components "Video Games," "Sports," "Patriot Games," and "Patriot: The Game" associated with nodes 910, 906, 920, and 912, respectively, from the term "Game" by finding the term included in the metadata description for each component. Process proceeds to step 1008.

At step 1008, control circuitry 704 matches each candidate component of the first plurality of candidate components to each candidate component of the second plurality of candidate components to form a plurality of pairs. For example, control circuitry 704 may determine a list of pairs of candidate components such as "The Patriot" and "Video Games," "The Patriot" and "Patriot: The Game," "Patriot Games" and "Sports," and more. In some embodiments, control circuitry 704 determines all possible pairs based on the identified candidate components. In some embodiments, a candidate component is paired with itself if associated with both the first and second term. For example, "Patriot Games" was identified for both terms and so a pair may be the single candidate component "Patriot Games" in node 920. Process proceeds to step 1010.

At step 1010, control circuitry 704 determines a strength of association for each pair in the plurality of pairs. For example, control circuitry 704 may determine that "The Patriot" in node 914 and "Video Games" in node 910 have a strong association, and "Patriot Games" in node 920 and "Sports" in node 906 have a weak association. In some embodiments, the strength of association is a value representative of a distance determined by values associated with the edges between nodes. While both "The Patriot" in node 914 and "Video Games" in node 910 and "Patriot Games" in node 920 and "Sports" in node 906 are only a node apart, if the edges between each node add up to a smaller sum, the total distance is smaller. In some embodiments, the strength of association is a category which is determined by a threshold distance such as a "Strong" association if the nodes are below the threshold and a "Weak" association if the nodes are above the threshold. Process proceeds to step 1012.

At step 1012, control circuitry 704 filters the plurality of pairs by the strength of association for each pair. In some embodiments, control circuitry 704 filters the plurality of pairs by identifying a first pair of the plurality of pairs, determining whether the first pair has a strength of association which is below a required threshold, excluding the first pair from the filtered plurality of pairs in response to determining that the strength of association is below the required threshold, and including the first pair in the filtered plurality of pairs in response to determining that the strength of association is not below the required threshold. For example, control circuitry 704 may remove the pair of "Patriot Games" in node 920 and "Sports" in node 906 based on the weak association between the candidate components, which indicates that the distance between the candidate components is not within the threshold distance. Process proceeds to step 1014.

In some embodiments, control circuitry 704 determines the required threshold based on the strength of association for each of the plurality of pairs, adjust the required threshold based on the filtered plurality of pairs, and filter the plurality of pairs based on the adjusted required threshold. For example, control circuitry 704 may set a first threshold based on an average distance between candidate components, and after filtering the plurality of pairs, determine that the threshold needs to be lower to further narrow down the options, and adjust the threshold accordingly.

At step 1014, control circuitry 704 determines a plurality of possible meanings associated with the query based on the filtered plurality of pairs. In some embodiments, control circuitry 704 determines a possible meaning by identifying a relevant media asset based on the pair of candidate components. For example, control circuitry 704 may determine that both of the pairs "The Patriot" in node 914 and "Video Games" in node 910, and "The Patriot" in node 914 and "The Patriot: The Game" in node 912 are referring to the media asset "The Patriot: The Game," as a video game associated with the movie, "The Patriot." Process proceeds to step 1016.

In some embodiments, control circuitry 704 isolates a command term from the query received from the user and determines the plurality of possible meanings associated with the query based on the filtered plurality of pairs and the command term. For example, control circuitry 704 may isolate the term "When is" as a command term and determine that all possible meanings must have an associated action of displaying program information relating to time. In some embodiments, control circuitry 704 determines the plurality of possible meanings by determining a plurality of possible meanings associated with the command term, where each of the possible meanings is associated with expected terms, comparing the expected terms associated with each possible meaning associated with the command term to the filtered plurality of pairs, filtering out a subset of the plurality of pairs based on the comparison, and determining the plurality of possible meanings associated with the query based on the subset of the plurality of pairs and the expected terms. For example, control circuitry 704 may expect any query containing the command term "When is" to also identify a broadcast media asset if the query also contains the word "on," and search the media assets determined to be related to the plurality of pairs so that only the broadcast media assets are used in the plurality of possible meanings.

In some embodiments, control circuitry 704 isolates a third term from the query received from the user and determines the plurality of possible meanings associated with the query based on the filtered plurality of pairs and the third term. For example, control circuitry 704 may isolate the term "TNT" from the query and limit the possible meanings to relate to media assets associated with the television channel TNT. In some embodiments, control circuitry 704 determines the plurality of possible meanings by identifying, in the knowledge graph 900, a third candidate component associated with the third term, identifying expected terms associated with the third candidate component, comparing the expected terms associated with the third candidate component to each pair in the filtered plurality of pairs, filtering out a subset of the plurality of pairs based on the comparison, and determining the plurality of possible meanings associated with the query based on the subset of the plurality of pairs and the expected terms. For example, control circuitry 704 may isolate the term "TNT" from the query, determine that there is an expectation that a term from the query is a broadcast media asset associated with the television channel TNT and limit the plurality of pairs to only those with candidate components with metadata identifying that it is broadcast on TNT.

In some embodiments, control circuitry 704 receives feedback on the accuracy for the plurality of possible meanings associated with the query and adjusts the required threshold based on the received feedback. For example, control circuitry 704 may receive feedback from the user that none of the results are relevant to the users query, and control circuitry 704 may raise the threshold so that fewer items are likely to be filtered out.

At step 1016, control circuitry 704 selects a meaning from the plurality of possible meanings associated with the query. For example, control circuitry 704 may identify the media assets "Patriot Games" which is playing on TNT at 8 pm, "Patriots vs. Jets" which is playing on FOX at 10 pm, and "The Patriot: The Game" which is in the Game Store, from the listed pairs, and determine to display program information about the movie "Patriot Games" playing on TNT at 8 pm because is the only one of the media assets playing on TNT.

In some embodiments, control circuitry 704 selects the meaning for the query by ranking the plurality of possible meanings according to a user preference and automatically determining the meaning for the query based on the ranking. For example, if the user preferences show that the user loves Actions Movies, and hates Sports and Video Games, control circuitry 704 may rank "Patriot Games" higher than "Patriots vs. Jets" and "The Patriot: The Game," and select "Patriot Games" as the meaning. In some embodiments, control circuitry 704 selects the meaning for the query by generating for display the plurality of possible meanings associated with query, and receiving a user selection of the meaning for the query. For example, control circuitry 704 may provide the user with the options of "Patriot Games," "Patriots vs. Jets," and "The Patriot: The Game" and allow the user to select one of the three options.

It is contemplated that the steps or descriptions of FIG. 10 may be used with any other embodiment of this disclosure. In addition, the descriptions described in relation to the algorithm of FIG. 10 may be done in alternative orders or in parallel to further the purposes of this disclosure. For example, conditional statements and logical evaluations may be performed in any order or in parallel or simultaneously to reduce lag or increase the speed of the system or method. As a further example, in some embodiments several instances of a variable may be evaluated in parallel, using multiple logical processor threads, or the algorithm may be enhanced by incorporating branch prediction. Furthermore, it should be noted that the process of FIG. 10 may be implemented on a combination of appropriately configured software and hardware, and that any of the devices or equipment discussed in relation to FIGS. 7-8 could be used to implement one or more portions of the process.

Figure 11:
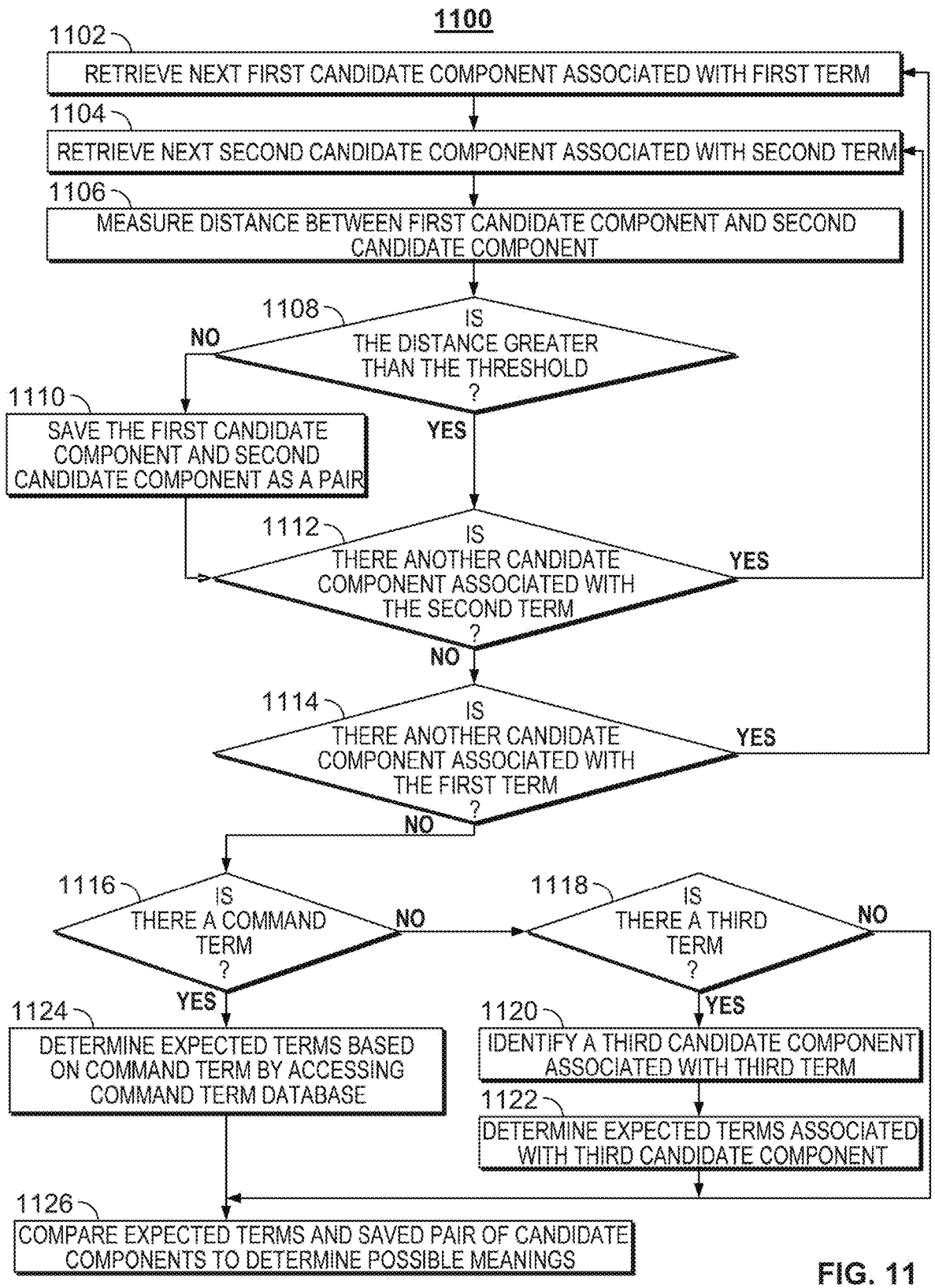
FIG. 11 is a flowchart of illustrative steps for identifying a meaning of an ambiguous term, in accordance with some embodiments of the disclosure.

FIG. 11 is a flowchart of illustrative steps for identifying a meaning of an ambiguous term, in accordance with some embodiments of the disclosure. FIG. 11 presents a process for control circuitry (e.g., control circuitry 704) to identify a meaning of an ambiguous term in accordance with some embodiments of the disclosure. In some embodiments, this algorithm may be encoded on to non-transitory storage medium (e.g., storage device 708) as a set of instructions to be decoded and executed by processing circuitry (e.g., processing circuitry 706). Processing circuitry may, in turn, provide instructions to other sub-circuits contained within control circuitry 704, such as the tuning, video generating, encoding, decoding, encrypting, decrypting, scaling, analog/digital conversion circuitry, and the like.

At step 1102, control circuitry 704 retrieves the next first candidate component associated with the first term. For example, control circuitry 704 may have identified candidate components in nodes 902, 912, 914, and 920 as associated with the term "Patriot." Control circuitry 704 retrieves "Patriots" in node 902 as the first candidate component. Process 1100 proceeds to step 1104.

At step 1104, control circuitry 704 retrieves the next second candidate component associated with the second term. For example, control circuitry 704 may have identified candidate components in nodes 904, 906, 908, 910, 912, and 920 as associated with the term "Game." Control circuitry 704 retrieves "Football" in node 904 as the second candidate component. Process 1100 proceeds to step 1106.

At step 1106, control circuitry 704 measures the distance between the first candidate component and the second candidate component. For example, "Patriots" and "Football" are 1 node apart on the knowledge graph 900. The distance may be measured in terms of nodes, or in terms of values associated with each edge between nodes. Process 1100 proceeds to step 1108.

At step 1108, control circuitry 704 determines whether the distance is greater than the threshold. For example, if the threshold is 3, the distance of 1 node is not greater than the threshold. If control circuitry 704 determines that the distance is greater than the threshold, process 1100 proceeds to 1112. Otherwise, process 1100 proceeds to 1110.

At step 1110, control circuitry 704 saves the first candidate component and second candidate component as a pair. For example, control circuitry 704 saves into storage the pair of candidate components "Patriots" in node 902 and "Football" in node 904. Process 1100 proceeds to step 1112.

At step 1112, control circuitry 704 determines whether there is another candidate component associated with the second term. For example, if control circuitry 704 detects additional second candidate components that have not yet been retrieved, control circuitry will determine that there is another second candidate component associated with the second term "Game." If control circuitry 704 determines that there is another candidate component, process 1100 proceeds to 1104. Otherwise, process 1100 proceeds to 1114.

At step 1114, control circuitry 704 determines whether there is another candidate component associated with the first term. For example, if control circuitry 704 detects additional first candidate components that have not yet been retrieved, control circuitry will determine that there is another first candidate component associated with the first term "Patriot." If control circuitry 704 determines that there is another candidate component, process 1100 proceeds to 1102. Otherwise, process 1100 proceeds to 1116.

At step 1116, control circuitry 704 determines whether there is a command term. For example, control circuitry 704 may identify the term "When is" in the query and identify it as a command term based on the predetermined list of command terms. If a command term is present in the query, process 1100 proceeds to step 1124. Otherwise, process 1100 process to step 1118.

At step 1118, control circuitry 704 determines whether there is a third term. For example, control circuitry 704 may identify the term "TNT" as a third term. If a third term is present in the query, process 1100 proceeds to step 1120. Otherwise, process 1100 proceeds to step 1126.

At step 1120, control circuitry 704 identifies a third candidate component associated with the third term. For example, control circuitry 704 accesses the knowledge graph 900, and identifies that candidate component "TNT" in node 918 associated with the term "TNT." Process 1100 proceeds to step 1122.

At step 1122, control circuitry 704 determines expected terms associated with the third candidate component. For example, control circuitry 704 determines that TNT in node 918 refers to a television channel, and it is expected to be associated with a broadcast media or actor. Process 1100 proceeds to step 1126.

At step 1124, control circuitry 704 determines expected terms based on the command term by accessing a command term database. For example, control circuitry 1124 determines, based on rules saved in a database, that the command term "When is" is associated with information regarding time and the combination of "When is" and "on" indicates a broadcast media asset or actor. Process 1100 proceeds to step 1126.

At step 1126, control circuitry 704 compares expected terms and the saved pair of candidate components to determine possible meanings. For example, control circuitry 704 considers each of the saved pairs of candidate components and filters out any pairs which do not refer to a broadcast media asset or actor based on the third term "TNT." If no command term or third term was identified, control circuitry 704 considers the expected terms associated with the candidate components themselves. For example, the pair of candidate components "Patriots" and "Football" may share the expected terms "won" and "score" and so control circuitry 704 may determine the user likely meant to generate the display of a score associated with the team the Patriots. Control circuitry 704 will add this possible meaning to the plurality of possible meanings.

It is contemplated that the steps or descriptions of FIG. 11 may be used with any other embodiment of this disclosure. In addition, the descriptions described in relation to the algorithm of FIG. 11 may be done in alternative orders or in parallel to further the purposes of this disclosure. For example, conditional statements and logical evaluations may be performed in any order or in parallel or simultaneously to reduce lag or increase the speed of the system or method. As a further example, in some embodiments several instances of a variable may be evaluated in parallel, using multiple logical processor threads, or the algorithm may be enhanced by incorporating branch prediction. Furthermore, it should be noted that the process of FIG. 11 may be implemented on a combination of appropriately configured software and hardware, and that any of the devices or equipment discussed in relation to FIGS. 7-8 could be used to implement one or more portions of the process.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
   receiving, via a user interface, a query from a user;
   identifying, by control circuitry, an ambiguous term in the received query by:
      accessing, by the control circuitry, a knowledge graph stored at a storage device to identify a plurality of nodes of the knowledge graph that are related to the ambiguous term and that respectively correspond to a plurality of interpretations of the identified ambiguous term;
   ranking, by the control circuitry, the plurality of interpretations based on user preferences stored at the storage device;
   generating, by the control circuitry, a plurality of replies to the received query based on the plurality of interpretations of the identified ambiguous term;
   identifying, by the control circuitry, a reply of the plurality of replies that is generated based on a top-ranked interpretation as a top-ranked reply; and
   in response to identifying the top-ranked reply, generating for simultaneous display, via the user interface, by the control circuitry, (i) only the top-ranked reply to the received query, of the plurality of replies to the received query, and (ii) an option to further cause, in addition to the top-ranked reply, one or more other replies to the received query, of the plurality of replies to the received query, to be generated for display.

2. The method of claim 1, wherein the option is selectable to toggle between generating for presentation the one or more other replies of the plurality of replies and generating for presentation only the top-ranked reply.

3. The method of claim 1, wherein the user preferences are based on at least one of monitoring user consumption of media assets or preferences input by the user.

4. The method of claim 3, wherein ranking the plurality of interpretations based on user preferences comprises:
   determining, based on the user preferences, that a particular genre of media assets is preferred by the user;
   determining that a first interpretation of the plurality of interpretations is associated with the particular genre; and
   increasing a rank of the first interpretation.

5. The method of claim 3, wherein ranking the plurality of interpretations based on user preferences comprises:
   determining, based on the user preferences, that a particular genre of media assets is disfavored by the user;
   determining that a first interpretation of the plurality of interpretations is associated with the particular genre; and
   decreasing a rank of the first interpretation.

6. The method of claim 1, wherein the user preferences are based on preset rules, and ranking the plurality of interpretations based on the user preferences comprises:
   determining the preset rules prioritize certain media assets over other media assets; and determining that a first interpretation of the plurality of interpretations is associated with said certain media assets; and increasing a rank of the first interpretation.

7. The method of claim 1, wherein generating for output only the top-ranked reply of the plurality of replies is performed in response to receiving a prior indication from the user to generate for output only the top-ranked reply.

8. The method of claim 1, wherein determining the plurality of interpretations of the identified ambiguous term further comprises querying a database of the storage device storing the knowledge graph.

9. The method of claim 1, further comprising:

receiving a selection of the option to further cause, in addition to the top-ranked reply, the one or more other replies to the received query, of the plurality of replies to the received query, to be generated for display;

generating for display, in addition to the top-ranked reply, the one or more other replies to the received query, of the plurality of replies to the received query; and in response to generating for display the one or more other replies to the received query, of the plurality of replies to the received query, generating for simultaneous display, via the user interface, by the control circuitry, an option to display only the top-ranked reply to the received query, of the plurality of replies to the received query.

10. The method of claim 1, further comprising:

receiving user feedback on accuracy for the top-ranked reply generated based on the top-ranked interpretation; and adjusting a weight of an association between nodes in the knowledge graph based on the user feedback.

11. The method of claim 1, further comprising:

generating for simultaneous display, with the top-ranked reply and the option, the received query, without generating for display any other queries previously received via the user interface.

12. The method of claim 1, wherein after receiving the query from the user via the user interface, the generating for simultaneous display is performed without receiving further input via the user interface.

13. A system comprising:

a storage device;

a user interface; and control circuitry configured to:

receive, via the user interface, a query from a user;

identify an ambiguous term in a received query by:

accessing a knowledge graph stored at the storage device to identify a plurality of nodes of the knowledge graph that are related to the ambiguous term and that respectively correspond to a plurality of interpretations of the identified ambiguous term;

rank the plurality of interpretations based on user preferences stored at the storage device;

generate a plurality of replies to the received query based on the plurality of interpretations of the identified ambiguous term;

identify a reply of the plurality of replies that is generated based on a top-ranked interpretation as a top-ranked reply; and generate for simultaneous display, via the user interface, by the control circuitry, (i) only the top-ranked reply to the received query, of the plurality of replies to the received query, and (ii) an option to further cause, in addition to the top-ranked reply, one or more other replies to the received query, of the plurality of replies to the received query, to be generated for display.

14. The system of claim 13, wherein the option is selectable to toggle between generating for presentation the one or more other replies of the plurality of replies and generating for presentation only the top-ranked reply.

15. The system of claim 13, wherein the user preferences are based on at least one of monitoring user consumption of media assets or preferences input by the user.

16. The system of claim 15, wherein the control circuitry is configured to rank the plurality of interpretations based on user preferences by:

determining, based on the user preferences, that a particular genre of media assets is preferred by the user;

determining that a first interpretation of the plurality of interpretations is associated with the particular genre; and increasing a rank of the first interpretation.

17. The system of claim 15, wherein the control circuitry is configured to rank the plurality of interpretations based on user preferences by:

determining, based on the user preferences, that a particular genre of media assets is disfavored by the user;

determining that a first interpretation of the plurality of interpretations is associated with the particular genre; and decreasing a rank of the first interpretation.

18. The system of claim 13, wherein the user preferences are based on preset rules, and the control circuitry is configured to rank the plurality of interpretations based on the user preferences by:

determining the preset rules prioritize certain media assets over other media assets; and determining that a first interpretation of the plurality of interpretations is associated with said certain media assets; and increasing a rank of the first interpretation.

19. The system of claim 13, wherein the control circuitry is configured to generate for output only the top-ranked reply of the plurality of replies is performed in response to receiving a prior indication from the user to generate for output only the top-ranked reply.

20. The system of claim 13, wherein the control circuitry is further configured to:

receive user feedback on accuracy for the top-ranked reply generated based on the top-ranked interpretation; and adjust a weight of an association between nodes in the knowledge graph based on the user feedback.

* * * * *